(12) United States Patent
Leskinen et al.

(10) Patent No.: US 9,475,896 B2
(45) Date of Patent: Oct. 25, 2016

(54) LOOP REACTOR PROVIDING AN ADVANCED PRODUCTION SPLIT CONTROL

(71) Applicant: Borealis AG, Vienna (AT)

(72) Inventors: Pauli Leskinen, Helsinki (FI); Sameli Hakola, Helsinki (FI); Kauno Alastalo, Porvoo (FI); Klaus Nyfors, Porvoo (FI)

(73) Assignee: Borealis AG (AT)

( * ) Notice: Subject to any disclaimer, the term of this patent is extended or adjusted under 35 U.S.C. 154(b) by 204 days.

(21) Appl. No.: 14/365,318

(22) PCT Filed: Dec. 12, 2012

(86) PCT No.: PCT/EP2012/075222
§ 371 (c)(1),
(2) Date: Jun. 13, 2014

(87) PCT Pub. No.: WO2013/092342
PCT Pub. Date: Jun. 27, 2013

(65) Prior Publication Data
US 2014/0378629 A1 Dec. 25, 2014

(30) Foreign Application Priority Data

Dec. 19, 2011 (EP) .................................. 11194305

(51) Int. Cl.
*C08F 110/06* (2006.01)
*C08F 2/01* (2006.01)
*C08F 2/14* (2006.01)
*B01J 19/00* (2006.01)
*B01J 19/24* (2006.01)
*C08F 10/00* (2006.01)
*C08F 2/38* (2006.01)
*C08F 210/06* (2006.01)

(52) U.S. Cl.
CPC .......... *C08F 110/06* (2013.01); *B01J 19/0033* (2013.01); *B01J 19/0053* (2013.01); *B01J 19/245* (2013.01); *B01J 19/2435* (2013.01); *B01J 19/2455* (2013.01); *C08F 10/00* (2013.01); *B01J 2219/0004* (2013.01); *B01J 2219/00049* (2013.01); *C08F 210/06* (2013.01)

(58) Field of Classification Search
CPC ...... B01J 19/245; B01J 19/2435; C08F 2/14; C08F 110/06
USPC ........................................................ 422/134
See application file for complete search history.

(56) References Cited

FOREIGN PATENT DOCUMENTS

| | | |
|---|---|---|
| CN | 1208046 A | 2/1999 |
| CN | 1708515 A | 12/2005 |
| CN | 1918193 A | 2/2007 |
| CN | 1953996 A | 4/2007 |
| EP | 0891990 A2 | 1/1999 |
| EP | 1415999 A1 | 5/2004 |
| EP | 1564228 A1 | 8/2005 |
| EP | 1591459 A1 | 11/2005 |
| EP | 1803498 A1 | 4/2007 |
| EP | 2374823 A1 | 10/2011 |
| JP | 62-13408 A | 1/1987 |

OTHER PUBLICATIONS

First Japanese Office Action dated Apr. 15, 2015.
JP62-13408 Abstract cited in 1st OA.
Chinese Search Report dated Apr. 20, 2015.
First Chinese Office Action dated Apr. 28, 2015.

*Primary Examiner* — Fred M Teskin
(74) *Attorney, Agent, or Firm* — Tarolli, Sundheim, Covell & Tummino LLP

(57) ABSTRACT

Method for preparing olefin polymer in a loop reactor, said loop reactor comprises a first outlet for withdrawing polymer slurry from the loop reactor, and a second outlet for withdrawing a polymer slurry from the loop reactor, wherein the first outlet is located such that polymer slurry is withdrawn having a concentration of polymer which is equal or higher than the average concentration of polymer in the loop reactor, and the second outlet is located such that polymer slurry is withdrawn having a concentration of polymer which is lower than the average concentration of polymer in the loop reactor, the method comprises the steps of supplying olefin monomers and a catalytic system to the loop reactor to form a polymer slurry in the loop reactor, and controlling the total amount of polymer and/or the total amount of polymer slurry withdrawn from the loop reactor by adjusting the ratio of polymer slurry withdrawn through the first outlet and polymer slurry withdrawn through the second outlet.

15 Claims, No Drawings

LOOP REACTOR PROVIDING AN ADVANCED PRODUCTION SPLIT CONTROL

The present invention relates to new method for producing olefin polymer in a loop reactor and/or in a reactor system comprising a loop reactor and to a new reactor system comprising a loop reactor.

The loop reactor was developed in the 1950's and is now widely used for the production of polypropylene and other olefin polymers. In a loop reactor, olefins such as ethylene and/or propylene are polymerised in the presence of a hydrocarbon diluent in slurry phase at elevated pressure and temperature. The polymer slurry is then withdrawn from the loop reactor and in case of a cascaded polymerisation process conducted to the next reaction vessel such as a gas phase reactor. Several approaches for the continuous withdrawal of polymer slurry from such loop reactor have been proposed in the art. In this context, it is well known that the location of the outlet on the loop reactor is decisive for the amount of polymer found in the withdrawn slurry. For instance, EP 1415999 A1 discloses a process where the slurry is continuously withdrawn from the loop reactor and then concentrated in a hydrocyclone. The diluent is redirected into the loop reactor. Also EP 891990 A2 discloses continuous withdrawal of slurry from a loop reactor, wherein the slurry is withdrawn from a location where the solids concentration is higher than the average solids concentration within the reactor.

However, while in many cases it is preferred to locate said outlet such that the withdrawn slurry has a higher concentration of polymer than the average concentration of polymer in the slurry within the reactor, it should be noted that such withdrawal of polymer slurry can be disadvantageous in some cases. For instance, during the start-up phase it is difficult and time-consuming to increase the polymer concentration within the reactor slurry to the desired level if the withdrawn slurry has a higher concentration of solids than the slurry within the reactor. Furthermore, where the loop reactor is a part of a reactor cascade, the productivity of the catalyst within the loop reactor may suffer if the residence time of the olefin polymer is not sufficiently high. In addition thereto, where accurate control of reactor split is required this is conveniently achieved when the concentration of polymer in the slurry within the loop reactor is maintained at a constant level.

In view of the foregoing, improving the olefin polymerization process remains of interest to the skilled man. It would be especially desirable to allow the easy and effective adjustment of polymer content in polymer slurry during the start-up phase of a polymerization process and the follow-up polymerization reaction and the effective control of the residence time of an olefin polymer in the loop reactor.

The finding of the present invention is that the loop reactor must comprise a combination of two outlets, i.e. first and second outlet, and, furthermore, that the first outlet must be located such that polymer slurry is withdrawn having a concentration of polymer which is the same as or higher than the average concentration of polymer in the loop reactor, and the second outlet must be located such that polymer slurry is withdrawn having a concentration of polymer which is lower than the average concentration of polymer in the loop reactor.

Accordingly, the present invention is directed in a first aspect to a method for preparing olefin polymer in at least one loop reactor, said loop reactor comprises
(a) at least one lower horizontal segment and/or at least one lower bend,
(b) at least one upper horizontal segment and/or at least one upper bend, and
(c) at least two vertical segments,
connected in operable communication,
said loop reactor further comprises
(d) a first outlet for withdrawing a $1^{st}$ polymer slurry from the loop reactor, said $1^{st}$ polymer slurry comprises olefin polymer and fluid phase; said first outlet is located such that the $1^{st}$ polymer slurry withdrawn has a concentration of polymer which is the same as or higher than the average concentration of polymer in the loop reactor, and
(e) a second outlet for withdrawing a $2^{nd}$ polymer slurry from the loop reactor, said $2^{nd}$ polymer slurry comprises olefin polymer and fluid phase; said second outlet is located such that the $2^{nd}$ polymer slurry withdrawn has a concentration of polymer which is lower than the average concentration of polymer in the loop reactor,
the method comprises the steps of
(i) supplying olefin monomers, a catalytic system, and optionally olefin comonomers to the loop reactor to form a polymer slurry in the loop reactor,
(ii) controlling
  (ii1) the total amount of polymer withdrawn from the loop reactor and/or
  (ii2) the total amount of polymer slurry withdrawn from the loop reactor and/or
  (ii3) the concentration of polymer within the total polymer slurry withdrawn from the loop reactor
  by adjusting the ratio of the $1^{st}$ polymer slurry withdrawn through the first outlet and the $2^{nd}$ polymer slurry withdrawn through the second outlet, and
(iii) optionally transferring the withdrawn total polymer slurry into a second reactor, i.e. into a gas phase reactor.

The method is in particular feasibly in a loop reactor comprising
(a) at least one lower horizontal segment and/or at least one lower bend,
(b) at least one upper horizontal segment and/or at least one upper bend, and
(c) at least two vertical segments,
connected in operable communication,
said loop reactor further comprises a first and second outlet suitable for withdrawing polymer slurry, wherein
the first outlet is located at the outer periphery of the lower horizontal segment or of the lower bend of the loop reactor and
the second outlet is located at
(i) the inner periphery of the lower horizontal segment of the loop reactor or of the inner periphery of the lower bend of the loop reactor,
and/or
(ii) the inner periphery of the upper horizontal segment of the loop reactor or the inner periphery of the upper bend of the loop reactor.

Accordingly in one embodiment the method is conducted in at least one loop reactor, said loop reactor comprises
(a) one lower horizontal segment,
(b) two lower bends,
(c) one upper horizontal segment,
(d) two upper bends, and
(e) two vertical segments, connected in operable communication, wherein the two lower bends joining the lower horizontal segment with the two vertical segments and the two upper bends joining the upper horizontal segment with the two vertical segments, said loop reactor further comprises a first and second outlet suitable for withdrawing polymer slurry, wherein
the first outlet is located at the outer periphery of the lower horizontal segment or is located at the outer periphery of one of the two lower bends of the loop reactor, preferably the first outlet is located at the outer periphery of the lower horizontal segment, and the second outlet is located at
(i) the inner periphery of the lower horizontal segment of the loop reactor or the inner periphery of one of the two lower bends of the loop reactor, preferably the inner periphery of one of the two lower bends of the loop reactor,
and/or
(ii) the inner periphery of the upper horizontal segment of the loop reactor or the inner periphery of one of the two upper bends of the loop reactor.

Especially preferred the second outlet is located at the inner periphery of one of the two lower bends of the loop reactor.

In another embodiment the method is conducted in at least one loop reactor, wherein said loop reactor has no horizontal segments. Accordingly said loop reactor, i.e. the loop reactor without horizontal segments, comprises
(a) one lower bend,
(b) one upper bend, and
(c) two vertical segments
connected in operable communication, wherein the lower bend and upper bend joining the two vertical segments, said loop reactor further comprises a first and second outlet suitable for withdrawing polymer slurry, wherein
the first outlet is located at the outer periphery of the lower bend of the loop reactor, and the second outlet is located at
(i) the inner periphery of the lower bend of the loop reactor, and/or
(ii) the inner periphery of the upper bend of the loop reactor.

Especially preferred the second outlet is located at the inner periphery of the lower bend of the loop reactor.

Accordingly the present invention is directed in a second aspect to a polymerization reactor system comprising a plurality of polymerization reactor vessels for preparing olefin polymers, said polymerization reactor system comprises in a cascade at least one loop reactor and at least one further reactor being preferably a gas phase reactor, wherein said loop reactor comprises
(a) at least one lower horizontal segment and/or at least one lower bend,
(b) at least one upper horizontal segment and/or at least one upper bend, and
(c) at least two vertical segments
connected in operable communication,
said loop reactor further comprises a first and second outlet suitable for withdrawing polymer slurry, said first and second outlet are connected with the second reactor via a conduit,
wherein further,
the first outlet is located at the outer periphery of the lower horizontal segment or is located at the outer periphery of the lower bend of the loop reactor and the second outlet is located at
(i) the inner periphery of the lower horizontal segment of the loop reactor or the inner periphery of the inner periphery of the lower bend of the loop reactor,
and/or
(ii) the inner periphery of the upper horizontal segment of the loop reactor or the inner periphery of the upper bend of the loop reactor.

In preferred embodiments of the polymerization reactor system a loop reactor is used as defined above when discussing the instant method and as defined in further detail below.

It has been surprisingly found out that such a method and such a polymerization reactor system enables the skilled person to adjust very easily and in rather short term the polymer concentration in polymer slurry during the start-up phase of a polymerization process and the follow-up polymerization reaction and to control the residence time of an olefin polymer in the loop reactor. Thus, the instant method as well as the instant polymerization reactor system enable to increase the overall productivity of a polymerization process in a loop reactor.

When in the following reference is made to preferred embodiments or technical details of the inventive loop reactor, it is to be understood that these preferred embodiments or technical details also refer to the inventive polymerization reactor system, to the inventive method for preparing olefin polymers in a loop reactor, as well as to the inventive use of the second outlet in a loop reactor for the preparation of an olefin polymer and to the inventive use of the combination of first and second outlet in a loop reactor for controlling the average residence time of an olefin polymer in a loop reactor defined herein and vice versa (as far as applicable). If, for example, it is set out that the average concentration of polymer within the inventive loop reactor is between 15 wt.-% and 55 wt.-%, also the average concentration of polymer provided in the inventive polymerization reactor system, the inventive method and olefin polymer obtainable from said method as well as the inventive uses is between 15 wt.-% and 55 wt.-%.

The present invention is now described in more detail:

The term "monomer" in contrast to the term "comonomer" indicates that the "monomer" represents the constitutional unit in the final polymer chain. Normally the monomer constitutes at least 50 wt.-% of the polymer, more preferably at least 60 wt.-%, especially preferably at least 80 wt-% and in particular at least 90 wt %, whereas the comonomers constitute the remaining part of the polymer.

A slurry comprises a solid phase and a fluid phase. The fluid phase according to this invention can be either a liquid or a supercritical liquid. It contains the diluent and reactants, i.e. monomer, eventual comonomers and hydrogen. The term "polymer slurry" shall indicate that the polymer is the main part of the solid phase, however may contain other solid particles like the catalyst.

The term "diluent" covers preferably liquid monomers which are used for the polymerization, like propylene, or liquid $C_3$ to $C_{10}$ hydrocarbons, like propane, n-butane, isobutane, pentane or hexane. In one preferred embodiment the diluent is propane and/or propylene, the latter is especially preferred in case the produced polymer is a polypropylene.

The "$1^{st}$ polymer slurry" is the polymer slurry withdrawn from the first outlet.

The "$2^{nd}$ polymer slurry" is the polymer slurry withdrawn from the second outlet.

The "total polymer slurry" or "withdrawn total polymer slurry" in contrast to the (overall) polymer slurry in the loop reactor is the slurry obtained by combining the $1^{st}$ slurry and the fluid phase of the second outlet, i.e. the diluent or the $2^{nd}$ polymer slurry.

The present invention is applicable to any olefin homopolymerization or copolymerization carried out in a loop reactor and optionally in at least one subsequent reactor like a gas phase reactor utilizing a diluent such as to prepare a polymer slurry comprising olefin polymer and said diluent. For example, in the instant loop reactor propylene may be homopolymerised or copolymerised with at least one ethylene and/or $C_4$ to $C_{20}$ alpha-olefin or ethylene may be homopolymerised or copolymerised with at least one $C_3$ to $C_{20}$ alpha-olefin. The polymerization preferably takes place in an inert hydrocarbon diluent.

Accordingly the present invention is in particular directed to homopolymerization or copolymerization of propylene or ethylene. In one embodiment the present invention is directed to a method for producing a heterophasic propylene copolymer in which at least part of the matrix or the total matrix of the heterophasic propylene copolymer is produced in the loop reactor, whereas the elastomeric phase is produced in a reactor downstream to the loop reactor. In one embodiment the present invention is directed to a method for producing a heterophasic propylene copolymer in which in the loop reactor the polypropylene matrix is produced and in the subsequent second reactor, like a gas phase reactor, the elastomeric phase is polymerized in the presence of the matrix. In another preferred embodiment the method is directed to the preparation of a heterophasic propylene copolymer in which in the loop reactor the first part of the matrix is produced and in the second reactor, preferably in a gas phase reactor, the second part of the matrix is polymerized. Subsequently the so obtained matrix is transferred in one or more (gas phase) reactors, preferably in two reactors connected in series, in which the elastomeric phase of the heterophasic system is polymerized. The instant method of course covers also the preparation of a (semi)crystalline propylene homopolymer or copolymer produced in the loop reactor and in one or more subsequent reactors, preferably one reactor, like a gas phase reactor, located downstream to the loop reactor.

The temperature in the loop reactor is typically from 50° C. to 110° C., preferably from 60° C. to 100° C. and most preferably from 65° C. to 95° C. If ethylene or propylene is homopolymerised in the loop reactor, it is sometimes preferred to operate the loop reactor at conditions known as "supercritical", where the operating temperature exceeds the critical temperature of the reaction mixture and the operating pressure exceeds the critical pressure of the reaction mixture. At such conditions, the operation temperature is preferably higher than 90° C. and most preferably higher than 93° C. The term "supercritical fluid" as used herein denotes a fluid or fluid mixture at a temperature and pressure exceeding the critical temperature and pressure of said fluid or fluid mixture.

The temperature in the loop reactor may be controlled and adjusted by any method known to the skilled person.

During the polymerization process, the slurry within the loop reactor is continuously circulated along the loop reactor by using a circulating pump or other means well known to the skilled person. As it is well known to the person skilled in the art the flow rate is such that the polymer does not settle within the reactor but the slurry remains homogeneous.

The olefin polymerization, like the propylene and/or ethylene polymerization, in the loop reactor is preferably conducted in slurry phase, whereby the polymer particles formed in the polymerization reaction, together with the catalyst fragmented and dispersed within the polymer particles, are suspended in the diluent. As discussed above the slurry is further agitated by circulating it along the reactor to enable the transfer of reactants from the diluent into the polymer particles.

In case of propylene polymerization, the slurry polymerization is preferably a so called bulk polymerization. The term "bulk polymerization" in the meaning of the present invention refers to a process in which the polymerization reaction is conducted in a liquid monomer essentially in the absence of any other inert diluent. However, as it is known to a person skilled in the art the monomers used in commercial production are never pure but always contain aliphatic hydrocarbons as impurities. For instance, the propylene monomer may contain up to 5 wt.-%, based on the total weight of the propylene, of propane as an impurity. As propylene is consumed in the reaction and may be also recycled from the reaction effluent back to the polymerization reaction, the inert components tend to accumulate, and thus the reaction medium, i.e. the diluent, may comprise up to 40 wt-%, based on the total weight of the reaction medium, of other compounds than monomer. It is to be understood, however, that such a polymerization process is still within the meaning of "bulk polymerization", as defined above.

The operating pressure needs to be selected such that the contents of the loop reactor remain either in liquid state or supercritical state. For liquid slurry operation, the suitable range of operating pressure is from 1 bar to 150 bar and preferably from 10 bar to 100 bar. For supercritical slurry operation, the suitable range of operating pressure is from 50 bar to 100 bar and preferably from 55 bar to 80 bar.

The pressure in the loop reactor may be controlled and adjusted by any method known to the skilled person.

Furthermore, hydrogen may be introduced into the loop reactor such as to control the molecular weight of the prepared polymer. The amount of hydrogen mainly depends on the catalytic system used and the desired molecular weight, or melt flow rate $MFR_2$ of the final polymer. One or more comonomers may also be introduced into the reactor to modify the mechanical properties, density and flexibility of the final polymer and/or to facilitate a stable operation of the polymerization reaction process in the loop reactor.

Preferably, olefin monomers such as ethylene or propylene are (co)polymerized in the loop reactor in the presence of hydrogen and optional comonomers to produce the polymer.

The average concentration of polymer in the polymer slurry within the loop reactor is typically from 15 wt.-% to 55 wt.-%, based on the total weight of the polymer slurry within the loop reactor. In one preferred embodiment of the present invention the average concentration of polymer in the polymer slurry within the loop reactor is from 20 wt.-% to 55 wt.-% and more preferably from 25 wt.-% to 52 wt.-%, based on the total weight of the polymer slurry within the loop reactor.

The concentration of polymer in the polymer slurry may be determined according to any method known to the skilled person. It can be determined, for instance, by measuring the density of the slurry using a suitable method known in the art, such as by radioactive measurement, ultrasound measurement and like. The concentration of the polymer in the slurry can then be calculated by using the following equation:

$$w_p = \frac{\rho_s - \rho_f}{\rho_p - \rho_f} \cdot \frac{\rho_p}{\rho_s}$$

where
$w_p$ is the weight fraction of the polymer in the slurry,
$\rho_s$ is the density of the slurry,
$\rho_f$ is the density of the fluid phase and
$\rho_p$ is the density of the polymer.

The catalytic system used in the loop reactor and any subsequent reactor may be any polymerization catalytic system known in the art. Thus, the catalytic system may be a chromium catalyst, as disclosed in e.g. EP 279890 or EP 307907. It may also be a Ziegler-Natta catalyst, such as disclosed in e.g. EP 688794, EP 949274, WO 99/58584 or WO 01/55230. Furthermore, the catalytic system may be a metallocene catalyst as disclosed in e.g. WO 97/28170, WO 00/34341 or WO 2004/029112.

The polymerization reaction of olefin monomers, like propylene or ethylene, may be conducted as in any known loop reactor used for slurry polymerization. In such reactors the slurry is circulated with a high velocity along a closed pipe by using a circulation pump. Loop reactors are generally known in the art and examples are given, for instance, in U.S. Pat. No. 4,582,816 A, U.S. Pat. No. 3,405,109 A, U.S. Pat. No. 3,324,093 A, EP 479186 A and U.S. Pat. No. 5,391,654 A.

In general, a loop reactor of the present invention is of a continuous tubular construction.

In one embodiment the loop reactor of the present invention comprises at least one lower horizontal segment, at least one upper horizontal segment and at least two vertical segments which are connected in operable communication. For example, the inventive loop reactor comprises at least one lower horizontal segment, at least one upper horizontal segment and at least two vertical segments which are connected in operable communication. In particular, the horizontal and vertical segments may be operable connected to each other by using bends, like smooth bends or elbows, such as to provide a continuous flow within the loop reactor that is substantially free of internal obstructions. Accordingly the loop reactor preferably comprises
(a) one lower horizontal segment,
(b) two lower bends,
(c) one upper horizontal segment,
(d) two upper bends, and
(e) two vertical segments,
connected in operable communication, wherein the two lower bends joining the lower horizontal segment with the two vertical segments and the two upper bends joining the upper horizontal segment with the two vertical segments. More precisely one of two lower bends joins one end of the lower horizontal segment with lower end of the first vertical segment and the other of the two lower bends joins the other end of the lower horizontal segment with the lower end of the second vertical segment, whereas one of two upper bends joins one end of the upper horizontal segment with upper end of first vertical segment and the other of the two upper bends joins the other end of the upper horizontal segment with the upper end of the second vertical segment.

However, it should be noted that the configurations and shapes of a loop reactor can vary in a wide variety provided the continuous tubular construction defines a closed loop. Accordingly the horizontal segments may also be in the form of continuous bends connecting two vertical segments together. Accordingly the loop reactor comprises
(a) one lower bend,
(b) one upper bend, and
(c) two vertical segments
connected in operable communication, wherein the lower bend and upper bend joining the two vertical segments.

More precisely the lower bend joins with its one end the lower end of the first vertical segment and with its other end the lower end of the second vertical segment, whereas the upper bend joins with its one end the upper end of the first vertical segment and with its other end the upper end of the second vertical segment.

Furthermore, each horizontal and/or vertical segment may be provided in the form of a continuous segment or in the form of multiple segments. For example, the loop reactor of the present invention may be a vertical loop reactor or a horizontal loop reactor, preferably a vertical loop.

The heat developed during the polymerization reaction is typically removed by using indirect exchange means with a cooling medium, preferably water, such as jackets surrounding at least a part of the loop reactor. The volume of the loop reactor can vary in a wide range but is typically in the range of 10 dm$^3$ to 200 m$^3$.

During the normal operation of the polymerization process the polymer slurry is withdrawn from the loop reactor continuously through one outlet, preferably through the first outlet. "Normal operation" means that conditions in the loop reactor are adjusted in manner that the desired polymer is produced in the loop reactor and the concentration of the polymer in the polymer slurry has reached the desired level. In case the operation conditions get out of balance, for instance due to reduced catalyst activity, or it shall be switched from one polymer grade to another polymer grade during the normal operation the withdrawal from the first outlet may be reduced or increased. However such a regulation by just one outlet is rather slow and often not suitable to control the polymerization conditions sufficiently.

Accordingly, one specific requirement of the present invention is that the loop reactor comprises in addition to the first outlet a second outlet. The first and the second outlet are preferably connected with a second reactor, like a gas phase reactor. Accordingly via the first and second outlets $1^{st}$ polymer slurry and $2^{nd}$ polymer slurry, respectively, can be withdrawn from the loop reactor and transferred to the second reactor, i.e. the gas phase reactor. Preferably the $1^{st}$ polymer slurry of the first outlet and the $2^{nd}$ polymer slurry of the second outlet are combined upstream to the second reactor and subsequently transferred together into the second reactor.

The first and second outlet may be placed at any suitable location in the loop reactor. However, it should be noted that the first and second outlet must be located at differing positions in the loop reactor. Only in such a case it can be assured that from both outlets different polymer slurries are withdrawn.

Accordingly, it is appreciated that the first outlet must be located such that $1^{st}$ polymer slurry is withdrawn from the loop reactor having a concentration of polymer which is the same as or higher than the average concentration of polymer in the loop reactor.

Additionally, the second outlet must be located in the loop reactor such that $2^{nd}$ polymer slurry is withdrawn having a concentration of polymer which is lower than the average concentration of polymer in the loop reactor.

As already indicated above, the average concentration of polymer in the polymer slurry within the loop reactor is typically from 15 wt.-% to 55 wt.-%, preferably from 20 wt.-% to 55 wt.-% and more preferably from 25 wt.-% to 52 wt.-%, based on the total weight of the polymer slurry within the loop reactor.

Thus, it is appreciated that the first outlet is located in the loop reactor such that the concentration of polymer in the $1^{st}$ polymer slurry at this specific location is the same as or higher than the average concentration of polymer in the loop reactor. For example, if the average concentration of polymer in the polymer slurry within the loop reactor is about 25 wt.-%, based on the total weight of the polymer slurry within the loop reactor, the first outlet is located in the loop reactor such that the concentration of polymer in the $1^{st}$ polymer slurry at this specific location is about 25 wt.-% or more, based on the total weight of the polymer slurry within the $1^{st}$ polymer slurry.

In contrast thereto, it is appreciated that the second outlet is located in the loop reactor such that the concentration of polymer in the $2^{nd}$ polymer slurry at this specific location is lower than the average concentration of polymer in the loop reactor. For example, if the average concentration of polymer in the polymer slurry within the loop reactor is about 25 wt.-%, based on the total weight of the polymer slurry within the loop reactor, the second outlet is located in the loop reactor such that the concentration of polymer in the $2^{nd}$ polymer slurry at this specific location is below 24 wt.-%, based on the total weight of the $2^{nd}$ polymer slurry.

Accordingly, the first outlet is suitably located at the outer periphery of the loop reactor. The term "outer periphery" in the meaning of the present invention refers to that side of the loop reactor which forms the open side of the closed loop, i.e. the first outlet is located at the tubular outer surface of the loop reactor. The first outlet may be located at the outer periphery of any one of the horizontal segments of the loop reactor or at the outer periphery of any one of the bends of the loop reactor.

In one preferred embodiment of the present invention, the first outlet is located at the outer periphery of the lower horizontal segment or at the outer periphery of one of the (two) lower bends of the loop reactor, preferably at the outer periphery of the lower horizontal segment of the loop reactor.

Additionally or alternatively, the second outlet is located at the inner periphery of the horizontal segments (lower or upper horizontal segment) or of the bends (lower or upper bend(s)) of the loop reactor. The term "inner periphery" in the meaning of the present invention refers to that side of the loop reactor which forms the closed side of the closed loop, i.e. the second outlet is located at the tubular inner surface of the loop reactor, namely at the inner surface of the horizontal segments (lower or upper horizontal segment) or at the inner surface of the bends (lower or upper bend(s)). Accordingly the second outlet is preferably located at the inner periphery of the lower horizontal segment or located at the inner periphery of the lower (two) bend(s) of the loop reactor. In one specific embodiment, i.e. in an embodiment where the loop reactor comprises horizontal segments, the second outlet is located at the inner periphery of one of the two lower bends, i.e. the bends joining the vertical segments to the lower horizontal segment. In another preferred embodiment, i.e. in an embodiment where the loop reactor comprises no horizontal segments, the second outlet is located at the inner periphery of the lower bend, i.e. the bend joining the two vertical segments.

Accordingly, it is appreciated that one specific embodiment of the present invention, i.e. an embodiment where the loop reactor comprises horizontal segments, refers to a loop reactor comprising a first and second outlet for withdrawing polymer slurry, wherein the first outlet is located at the outer periphery of the lower or upper horizontal segment or at the outer periphery of the lower or upper bends of the loop reactor and the second outlet is located at the inner periphery of the lower or upper horizontal segment or at the outer periphery of the lower or upper bends of the loop reactor.

In another preferred embodiment of the present invention, i.e. in an embodiment where the loop reactor comprises no horizontal segments, the loop reactor comprises a first and second outlet for withdrawing polymer slurry, wherein the first outlet is located at the outer periphery of the of the lower or upper bend of the loop reactor and the second outlet is located at the inner periphery of lower or upper bend of the loop reactor.

In one preferred embodiment of the present invention, i.e. in an embodiment where the loop reactor comprises horizontal segments, the loop reactor comprises a first and second outlet for withdrawing polymer slurry, wherein the first outlet is located at the outer periphery of the lower horizontal segment or at the outer periphery of one of the two lower bends of the loop reactor, preferably at the outer periphery of the lower horizontal segment and the second outlet is located at the inner periphery of the upper horizontal segment or at the inner periphery of one of the two upper bends of the loop reactor, preferably at the inner periphery of one of the two upper bends of the loop reactor.

In another preferred embodiment of the present invention, i.e. in an embodiment where the loop reactor comprises no horizontal segments, the loop reactor comprises a first and second outlet for withdrawing polymer slurry, wherein the first outlet is located at the outer periphery of the lower bend of the loop reactor and the second outlet is located at the inner periphery of the upper bend of the loop reactor.

In one further preferred embodiment of the present invention, i.e. in an embodiment where the loop reactor comprises horizontal segments, the loop reactor comprises a first and second outlet for withdrawing polymer slurry, wherein the first outlet is located at the outer periphery of the lower horizontal segment or at the outer periphery of one of the two lower bends of the loop reactor, preferably at the outer periphery of the lower horizontal segment and the second outlet is located at the inner periphery of the lower horizontal segment or at the inner periphery of one of the two lower bends of the loop reactor, preferably at the inner periphery of one of the two lower bends of the loop reactor.

In another preferred embodiment of the present invention, i.e. in an embodiment where the loop reactor comprises no horizontal segments, the loop reactor comprises a first and second outlet for withdrawing polymer slurry, wherein the first outlet is located at the outer periphery of the lower bend of the loop reactor and the second outlet is located at the inner periphery of the lower bend of the loop reactor.

In accordance with the present application, the second outlet is operated before and/or during and/or after the first outlet. The term "operated" in connection with the outlets means according to this invention that polymer slurry is withdrawn from the loop reactor. Thus, it is appreciated that the amount of withdrawal of polymer slurry from the first and second outlet, respectively, is optimally adjusted to each other so that the desired concentration of polymer of the slurry within the loop reactor is achieved. As it is well known in the art, the total outflow of polymer slurry from the loop reactor through the first and second outlets may, for instance, be determined by the pressure controller which maintains the pressure in the loop reactor constant.

As mentioned above the withdrawn diluent or polymer slurry/slurries are preferably transferred to a second reactor, like a gas phase reactor. Accordingly the first and second outlet are preferably connected with the second reactor, like gas phase reactor, via a conduit. Even more preferred the conduit of the first outlet and the conduit of the second outlet are connected to each other at a connection point upstream to the second reactor and a further conduit leads from said connecting point into the second reactor.

By using the inventive loop reactor comprising the specific combination of first and second outlet, it is possible to adapt the amount of $1^{st}$ polymer slurry withdrawn through the first outlet and $2^{nd}$ polymer slurry, withdrawn from the second outlet to the specific needs required. Due to this regulation the amount of polymer in the loop reactor can be very easily and quickly regulated, be it at the beginning of a polymerization process or at normal operation of the loop reactor. Further, also the supply of polymer amount into the second reactor as well as the concentration of polymer in the total polymer slurry transferred into the second reactor can be very conveniently adjusted to the desired needs in the second reactor.

At the start up phase of the loop reactor the first outlet is preferably closed and the second outlet is open. Even more preferred the withdrawn fluid phase or $2^{nd}$ polymer slurry is transferred into the second reactor. Due to this specific switching (first outlet closed, second outlet open) the polymer concentration and residence time in the loop reactor can be increased to the desired level/time, by keep a constant mass flow through the loop reactor. If desired at the same time the second reactor can be already provided with some polymer slurry discharged from the second outlet.

Typically at the start up phase 50 to 100 wt.-%, based on the total amount of withdrawn slurry, $2^{nd}$ polymer slurry, is withdrawn from the second outlet and optionally transferred to the second reactor, like gas phase reactor. Preferably the polymer concentration in the $2^{nd}$ polymer slurry is from more than 0 to 10 wt-.%. Accordingly it is appreciated that $2^{nd}$ polymer slurry withdrawn contains from 0.1 to 5.0 wt.-%, like from 0.1 to 2.0 wt.-%, polymer.

In normal operation of the loop reactor and/or the polymerization reactor system comprising the loop reactor normally the first outlet is (fully) open and the second outlet is closed or just slightly open. At this situation it is appreciated that the overall amount of polymer slurry withdrawn from the loop reactor is mainly withdrawn through the first outlet, i.e. at least 90 wt.-%, like 90 to 100 wt.-%, more preferably at least 95 wt.-%, like 95 to 100 wt.-%, whereas the remaining part is withdrawn through the second outlet. However in case the conditions in the loop reactor change unintentionally (for instance by drop of catalyst activity) or it shall be switched at normal operation from polymerization of one specific polymer grade to another specific polymer grade, the second outlet can be opened, i.e. fully or partially opened, to intervene adjusting to adapt the conditions in the loop reactor as desired. Also in this case the $2^{nd}$ polymer slurry withdrawn from the loop reactor through the second outlet is preferably transferred into the second reactor.

At such circumstances it is preferred that the amount of $1^{st}$ polymer slurry withdrawn through the first outlet is between 65 wt.-% and 95 wt.-%, based on the weight of the total withdrawn polymer slurry. In one preferred embodiment of the present invention, the amount of $1^{st}$ polymer slurry withdrawn through the first outlet is between 70 wt.-% and 90 wt.-%, based on the weight of the total withdrawn polymer slurry. For example, the amount of $1^{st}$ polymer slurry withdrawn through the first outlet is between 75 wt.-% and 85 wt.-%, based on the weight of the total withdrawn polymer slurry.

Accordingly, the amount of $2^{nd}$ polymer slurry, withdrawn through the second outlet is between 5 wt.-% and 35 wt.-%, based on the weight of the total withdrawn polymer slurry. In one preferred embodiment of the present invention, the amount of $2^{nd}$ polymer slurry, withdrawn through the second outlet is between 10 wt.-% and 30 wt.-%, based on the weight of the total withdrawn polymer slurry. For example, the amount of $2^{nd}$ polymer slurry, withdrawn through the second outlet is between 15 wt.-% and 25 wt.-%, based on the weight of the total withdrawn polymer slurry.

Thus, in one preferred embodiment the amount of $1^{st}$ polymer slurry withdrawn through the first outlet is between 65 wt.-% and 95 wt.-%, based on the weight of the total withdrawn polymer slurry, and the amount of $2^{nd}$ polymer slurry, withdrawn through the second outlet is between 5 wt.-% and 35 wt.-%, based on the weight of the total withdrawn polymer slurry. In another preferred embodiment of the present invention, the amount of $1^{st}$ polymer slurry withdrawn through the first outlet is between 70 wt.-% and 90 wt.-%, based on the weight of the total withdrawn polymer slurry, and the amount of $2^{nd}$ polymer slurry, withdrawn through the second outlet is between 10 wt.-% and 30 wt.-%, based on the weight of the total withdrawn polymer slurry. For example, the amount of $1^{st}$ polymer slurry withdrawn through the first outlet is between 75 wt.-% and 85 wt.-%, based on the weight of the total withdrawn polymer slurry, and the amount of $2^{nd}$ polymer slurry, withdrawn through the second outlet is between 15 wt.-% and 25 wt.-%, based on the weight of the total withdrawn polymer slurry.

In the following typical conditions are provided to regulate the withdrawal from the loop reactor via the first and second outlet to adjust the operation conditions in the loop reactor and the optional second reactor.

It is appreciated that the ratio of $1^{st}$ polymer slurry withdrawn through the first outlet and $2^{nd}$ polymer slurry, withdrawn through the second outlet [PS-O1/PS-O2] is at least 1.8 and preferably at least 2.5, wherein "PS-O1" is the amount [given in weight percentage] of $1^{st}$ polymer slurry withdrawn through the first outlet, and "PS-O2" is the amount [given in weight percentage] of $2^{nd}$ polymer slurry, withdrawn through the second outlet.

Preferably, the ratio of polymer slurry withdrawn through the first outlet and the second outlet [PS-O1/PS-O2] is in the range of 1.8 and 19, more preferably in the range of 2 and 15, even more preferably in the range of 2 and 10 and most preferably in the range of 2 and 7.5, wherein "PS-O1" is the amount [given in weight percentage] of $1^{st}$ polymer slurry withdrawn through the first outlet, and "PS-O2" is the amount [given in weight percentage] of $2^{nd}$ polymer slurry, withdrawn through the second outlet.

For example, the ratio of polymer slurry withdrawn through the first outlet and the second outlet [PS-O1/PS-O2] is in the range of 3 and 6, like in the range of 3 and 5.

As already indicated above, the $1^{st}$ polymer slurry withdrawn through the first outlet may comprise an amount of polymer of at least 15 wt.-%, more preferably at least 20 wt.-% and most preferably at least 25 wt.-%, based on the total weight of polymer slurry withdrawn through the first outlet. In any case, the $1^{st}$ polymer slurry comprises polymer at least the same amount as is the average concentration of polymer within the loop reactor.

Alternatively, the $1^{st}$ polymer slurry withdrawn through the first outlet may comprise an amount of polymer of at most 60 wt.-%, more preferably at most 58 wt.-% and most preferably at most 55 wt.-%, based on the total weight of polymer slurry withdrawn through the first outlet.

Accordingly, it is appreciated that the $1^{st}$ polymer slurry withdrawn through the first outlet comprises an amount of polymer of between 15 wt.-% and 60 wt.-%, more preferably between 20 wt.-% and 58 wt.-% and most preferably between 25 wt.-% and 55 wt.-%, based on the total weight of polymer slurry withdrawn through the first outlet.

In contrast thereto, the $2^{nd}$ polymer slurry withdrawn through the second outlet has a concentration of polymer which is substantially lower than the average concentration of polymer in the polymer slurry within the reactor.

In particular, the $2^{nd}$ polymer slurry withdrawn through the second outlet may comprise an amount of polymer of more than 0.1 wt.-% and more preferably at least 0.5 wt.-%, based on the total weight of the withdrawn $2^{nd}$ polymer slurry through the second outlet.

Additionally or alternatively, the $2^{nd}$ polymer slurry withdrawn through the second outlet may comprise an amount of polymer of at most 10 wt.-% and more preferably at most 5 wt.-%, based on the total weight of the withdrawn $2^{nd}$ polymer slurry through the second outlet.

Accordingly, it is appreciated that the $2^{nd}$ polymer slurry withdrawn through the second outlet comprises an amount of polymer between 0.1 wt.-% and 10 wt.-%, more preferably between 0.5 wt.-% and 5 wt.-% and most preferably between 1 wt.-% and 5 wt.-%, based on the total weight of $2^{nd}$ polymer slurry withdrawn through the second outlet. For example, the $2^{nd}$ polymer slurry withdrawn through the second outlet comprises an amount of polymer of between 2 wt.-% and 4 wt.-%, like between 2.5 wt.-% and 3.5 wt.-%, based on the total weight of polymer slurry withdrawn through the second outlet.

In one preferred embodiment of the present invention, the ratio of polymer contained in the $1^{st}$ polymer slurry withdrawn through the first outlet and polymer contained in the $2^{nd}$ polymer slurry withdrawn through the second outlet [P-O1/P-O2] is at least 3, more preferably at least 5, wherein "P-O1" is the amount [given in weight percentage] of polymer contained in the $1^{st}$ polymer slurry withdrawn through the first outlet, and "P-O2" is the amount [given in weight percentage] of polymer contained in the $2^{nd}$ polymer slurry withdrawn through the second outlet.

For example, the ratio of polymer contained in the $1^{st}$ polymer slurry withdrawn through the first outlet and polymer contained in the $2^{nd}$ polymer slurry withdrawn through the second outlet [P-O1/P-O2] is in the range of 3 and 25, more preferably in the range of 5 and 20 and most preferably in the range of 5 and 15.

As mentioned above, the polymer slurry may be withdrawn from the loop reactor through the first outlet and/or the second outlet depending on the desired needs. Accordingly, in one preferred embodiment of the present invention, the polymer slurry is withdrawn continuously through the first outlet and second outlet. In another preferred embodiment of the present invention, the polymer slurry is withdrawn intermittently through the first outlet and second outlet. In another preferred embodiment of the present invention, the polymer slurry is withdrawn continuously through the first outlet and intermittently through the second outlet. In a further preferred embodiment of the present invention, the polymer slurry is withdrawn intermittently through the first outlet and continuously through the second outlet.

Intermittent withdrawal may be arranged, for instance, by using periodically opening valves, rotating valves, settling legs and the like. Continuous withdrawal is typically arranged by using a continuously operating control valve, such as a butterfly valve, whose position is adjusted, for instance, based on the pressure within the reactor. Such arrangements are well known to the skilled person and may be adapted to his needs required for carrying out the present invention.

As indicated above the loop reactor is preferably part of a polymerization reactor system comprising a plurality of polymerization reactor vessels for preparing olefin polymers, such as olefin homopolymers or copolymers as defined above. Said polymerization reactor vessels are connected in series. Accordingly, said polymerization reactor system comprises in a cascade a loop reactor and at least one further reactor. Any reactor subsequent to the loop reactor can be any polymerization reactor vessel for the polymerization of olefins, like again a loop reactor or a gas phase reactor, the latter preferred.

By "gas phase reactor" is meant any mechanically mixed or fluidized bed reactor. Preferably the gas phase reactor comprises a fluidized bed reactor with gas velocities of at least 0.1 msec.

A third polymerization reactor vessel or any subsequent polymerization reactor vessel of the polymerization reactor system may be any reactor type. However, it is preferred that the third or any subsequent polymerization reactor vessel of the polymerization reactor system is another gas phase reactor.

In one specific embodiment of the present invention, the instant polymerization reactor system consists of two polymerization reactor vessels, wherein one polymerization reactor vessel is the loop reactor as defined herein and the other polymerization reactor vessel is a gas phase reactor. In another preferred embodiment of the present invention, the instant polymerization reactor system comprises at least three polymerization reactor vessels, i.e. after the loop reactor as defined herein and the gas phase reactor follows at least a third polymerization reactor vessel. Preferably, the third polymerization reactor vessel is a gas phase reactor. The term "polymerization reactor vessel" shall indicate that the main polymerization takes place. Thus, in case the polymerization reactor system consists of two polymerization reactor vessels, this definition does not exclude the option that the overall polymerization reactor system comprises for instance a pre-polymerization step in a pre-polymerization reactor. The term "consists of" is only a closing formulation in view of the main polymerization reactor vessels.

In case the overall polymerization reactor system and/or the loop reactor as defined herein comprises a pre-polymerization step in a pre-polymerization reactor, the pre-polymerization may be conducted in a continuous stirred tank reactor or a loop reactor, preferably in a loop reactor. If a loop reactor is used for pre-polymerization, the loop reactor may or may not have one or more characteristics of the loop reactor as defined herein.

The pre-polymerization reaction is typically conducted at a temperature of 0° C. to 60° C., preferably from 10° C. to 50° C. and more preferably from 10° C. to 45° C.

The pressure in the pre-polymerization reactor is not critical but must be sufficiently high to maintain the reaction mixture in liquid phase. Accordingly, the pressure may be from 20 bar to 100 bar, for example 30 bar to 70 bar.

The conversion to pre-polymer is generally carried out by bringing the catalytic system into contact with one or more olefins such as ethylene and/or propylene and the optional comonomer in an amount such that the pre-polymer contains between 0.002 millimoles and 10 millimoles of transition metal per gram.

Alternatively or additionally, the amount of pre-polymer on the catalyst is preferably from 10 to 1000 g per g of the solid catalytic system component, more preferably is from 50 to 500 g per g of the solid catalytic system component.

The person skilled in the art knows that the particles of the catalytic system recovered from a continuous stirred pre-polymerization reactor do not all contain the same amount of pre-polymer. Instead, each particle has its own characteristic amount which depends on the residence time of that particle in the pre-polymerization reactor. As some particles remain in the reactor for a relatively long time and some for a relatively short time, then also the amount of pre-polymer on different particles is different and some individual particles may contain an amount of pre-polymer which is outside the above limits. However, the average amount of pre-polymer on the catalytic system is preferably within the limits specified above. The amount of pre-polymer prepared in the pre-polymerization reactor is known in the art, among others, from GB 1580635.

The pre-polymer particle size may be controlled by well known techniques known to the skilled person such as sieving, hydrocyclone or elutriation separation of fines or large particles and the like.

The components of the catalytic system are preferably all introduced into the pre-polymerization step. However, where the solid catalyst component and the cocatalyst can be fed separately it is possible that only a part of the cocatalyst is introduced into the pre-polymerization stage, while the remaining part is subsequently introduced into the polymerization stages such as the loop reactor as defined herein. Also in such cases it is necessary to introduce so much cocatalyst into the pre-polymerization stage that a sufficient polymerization reaction is obtained therein.

Furthermore, it is possible to introduce further components into the pre-polymerization stage. Accordingly, also hydrogen may be added into the pre-polymerization stage to control the molecular weight of the pre-polymer as is known to the skilled person. Furthermore, antistatic additives may be introduced to prevent the particles from adhering to each other or the walls of the reactor.

The pre-polymer is withdrawn from the pre-polymerization reactor continuously or intermittently through an outlet and preferably directly fed into the loop reactor as defined herein.

When the polymerization stage in the loop reactor is followed by a gas phase polymerization stage it is preferred to conduct the polymer slurry of the loop reactor directly into the gas phase polymerization zone without a flash step between the stages. This kind of direct feed is described in EP 887379 A, EP 887380 A, EP 887381 A and EP 991684 A. By "direct feed" is meant a process wherein the content of the loop reactor, the polymer slurry comprising olefin polymer and diluent, is led directly to the next stage gas phase reactor. Accordingly the $1^{st}$ polymer slurry of the first outlet and/or the $2^{nd}$ polymer slurry of the second outlet are directly feed to the second reactor, i.e. gas phase reactor. In one embodiment the $1^{st}$ polymer slurry of the first outlet and $2^{nd}$ polymer slurry of the second outlet are separately and directly feed to the second reactor. This can be for instance accomplished by leading the conduits connected with first and second outlet, respectively, directly into the second reactor or gas phase reactor. However in a preferred embodiment the $1^{st}$ polymer slurry of the first outlet and the $2^{nd}$ polymer slurry of the second outlet are combined upstream to the second reactor, i.e. gas phase reactor, and subsequently transferred together into the second reactor. In such a case the conduit of the first outlet and the conduit of the second outlet are connected to each other at a connection point upstream to the second reactor and a further conduit leads form said connecting point into the second reactor, i.e. gas phase reactor.

Alternatively, the polymer slurry may be also directed into a flash step or through a further concentration step before fed into the gas phase polymerization stage. Accordingly, this "indirect feed" refers to a process wherein the content of the loop reactor, i.e. the polymer slurry, is fed into a gas phase reactor via a reaction medium separation unit and the reaction medium as a gas from the separation unit. Before the polymer slurry is entered into the gas phase, some components, e.g. hydrogen, can be fully or partially removed therefrom with various technical means, such as a separation unit. "Separation unit" means a unit operation wherein some light components, e.g. hydrogen or optionally nitrogen, can be separated from monomer(s) fully or partially with various technical means such as flashing, membranes, distillation, stripping or vent condensing.

The gas phase reactor being part of the polymerization reactor system is preferably a fluidized bed reactor, a fast fluidized bed reactor or a settled bed reactor or any combination thereof. When a combination of gas phase reactors is used then the polymer is transferred from one polymerization reactor to another. Furthermore, a part or whole of the polymer from a polymerization stage may be returned into a prior polymerization stage, such as the prior loop reactor as defined herein and/or a prior gas phase reactor.

The gas phase reactor being part of the polymerization reactor system is preferably operated at a temperature of from 50° C. to 100° C., preferably from 65° C. to 95° C. The operating pressure is preferably from 10 bar to 40 bar, preferably from 15 bar to 30 bar.

In the gas phase reactor, an olefin polymer is prepared. For example, propylene monomers are copolymerised with at least one ethylene and/or $C_4$ to $C_{20}$ alpha-olefin comonomer, or the olefin monomers like propylene are homopolymerized.

In one preferred embodiment of the present invention, the olefin monomers like ethylene or propylene are homopolymerized in the gas phase reactor with a minor amount of hydrogen to produce a polyethylene homopolymer or polypropylene homopolymer. For example, the reaction mixture contains from 60 mol-% to 99 mol-% propylene and 0.001 mol-% to 3 mol-% hydrogen. The remainder is composed of inert components, like nitrogen or propane.

In another preferred embodiment of the present invention, the olefin monomers like ethylene and/or propylene are copolymerised in the gas phase reactor with a minor amount of hydrogen to produce a polyethylene copolymer or polypropylene copolymer. For example, the reaction mixture contains from 60 mol-% to 96 mol-% propylene, from 0.1 mol-% to 10 mol-% ethylene and/or $C_4$ to $C_{20}$ alpha-olefin comonomer and from 0.01 mol-% to 3 mol-% hydrogen. The remainder is composed of inert components, like nitrogen or propane.

Summarising what has been stated above, one particularly preferred aspect of the present invention further refers to a method for preparing olefin polymers in a loop reactor as defined herein and/or in a polymerization reactor system as defined herein, the method comprises the steps of supplying olefin monomers and a catalytic system to the loop reactor to form a polymer slurry in the loop reactor, and controlling (1) the total amount of polymer withdrawn from the loop reactor and/or (2) the total amount of polymer slurry withdrawn from the loop reactor and/or
(3) the concentration of polymer within the total polymer slurry withdrawn from the loop reactor
by adjusting the ratio of $1^{st}$ polymer slurry withdrawn through the first outlet and $2^{nd}$ slurry withdrawn through the second outlet.

With respect to preferred embodiments regarding method steps it is referred to the detailed statements provided above.

In case the method for preparing olefin polymers is carried out in the loop reactor being part of a polymerization reactor system, the polymer slurry withdrawn through the first outlet and the second outlet is preferably further directed into a gas phase reactor.

The production split obtained between the loop reactor as defined herein and the second reactor, i.e. the gas phase reactor, by implementing a polymerization reactor system as defined herein is typically 75:25 to 40:60, more preferably 65:35 to 50:50 and most preferably 60:40 to 50:50. For example, the production split obtained between the loop reactor and the gas phase reactor is about 55:45.

Additionally or alternatively, if the polymerization reactor system is implemented the production of olefin polymer in the loop reactor as defined herein is equal or more than the production in the gas phase reactor. Preferably, the production in the loop reactor as defined herein is more than 40 wt.-%, based on the total weight of the olefin polymer prepared. Thus, according to a preferred embodiment, 50 wt.-% to 75 wt.-%, preferably 50 wt.-% to 65 wt.-% and most preferably 50 wt.-% to 60 wt.-%, based on the total weight of the olefin polymer prepared, of the olefin polymer is prepared in the loop reactor as defined herein. Accordingly, the production in the gas phase reactor is less than 60 wt.-%, based on the total weight of the olefin polymer prepared. Thus, according to a preferred embodiment, 25 wt.-% to 50 wt.-%, preferably 35 wt.-% to 50 wt.-% and most preferably 40 wt.-% to 50 wt.-%, based on the total weight of the olefin polymer prepared, of the olefin polymer is prepared in the loop reactor as defined herein.

In particular, it is appreciated that the present invention also provides a method for controlling the average residence time of the olefin polymer formed in a loop reactor as defined herein and/or in the loop reactor of polymerization reactor system as defined herein. In particular, the method comprises the steps of
a) supplying olefin monomers, diluent and a catalytic system to the inventive loop reactor and/or the loop reactor being part of the polymerization reactor system as defined herein to form a polymer slurry,
(b) controlling
  (1) the total amount of polymer withdrawn from the loop reactor and/or
  (2) the total amount of polymer slurry withdrawn from the loop reactor and/or
  (3) the concentration of polymer within the total polymer slurry withdrawn from the loop reactor
  by adjusting the ratio of $1^{st}$ polymer slurry withdrawn through the first outlet and $2^{nd}$ polymer slurry withdrawn through the second outlet.

With respect to preferred embodiments regarding method steps it is referred to the detailed statements provided above.

In view of the foregoing, the present invention refers in a further aspect to the use of the second outlet located at a loop reactor as defined herein for controlling
(1) the total amount of polymer withdrawn from the loop reactor and/or
(2) the total amount of polymer slurry withdrawn from the loop reactor and/or
(3) the concentration of polymer within the total polymer slurry withdrawn from the loop reactor
by adjusting the withdrawal of fluid phase through the second outlet.

In one preferred embodiment of the present invention, the use of a combination of first and second outlet located at a loop reactor as defined herein for controlling the average residence time of an olefin polymer in a loop reactor is provided.

The present invention will now be described in further detail by the examples provided below.

EXAMPLES

A. Catalyst Preparation

The solid catalyst component was prepared according to Example 8 of WO 2004/029112, except that diethylaluminium chloride was used as an aluminium compound instead of triethylaluminium.

B. Polymerization a) Inventive Example 1 (IE1)

The catalyst described above was continuously introduced into a prepolymerization reactor at a rate of 1.6 g/h. The prepolymerization reactor was a stirred tank reactor having a volume of 45 dm$^3$ and operated as liquid-filled at a temperature of 30° C. and a pressure of 54 bar. Prior to the introduction the catalyst feed was combined with a feed containing triethyaluminium (TEA) and dicyclopentyldimethoxysilane (DPDMS) so that the molar ratio of TEA/Ti was 262 and the molar ratio of DPDMS/TEA was 10. Hydrogen feed was about 36 g/h and propylene feed such that the average residence time was 0.3 hours. The slurry from the prepolymerization reactor was directed to a loop reactor having a volume of 150 dm$^3$ and which was operated at a temperature of 80° C. and a pressure of 52 bar. Into the loop reactor propylene was fed at a rate of 205 kg/h. No fresh hydrogen was added but all the hydrogen came via the prepolymerization reactor. The production rate of propylene homopolymer was 29 kg/h and the melt flow rate MFR$_2$ was 14 g/10 min. The polymer slurry from the loop reactor was directly conducted into a first gas phase reactor operated at a temperature of 90° C. and a pressure of 24 bar. The slurry was withdrawn via two outlets. Via the first outlet 80 wt.-%, based on the total weight of the withdrawn slurry, of slurry was withdrawn where the concentration of the polymer was the same as it was in the reactor, i.e. the first outlet was located at the outer periphery of a lower horizontal segment of the loop reactor. Via the second outlet 20 wt.-%, based on the total weight of the withdrawn slurry, of slurry was withdrawn, located at the inner periphery of the lower horizontal segments of the loop reactor. The slurry withdrawn through the second outlet had a polymer concentration of about 3 wt.-%, based on the total weight of the slurry withdrawn through the second outlet.

In addition to the polymer slurry withdrawn from the loop reactor, propylene and hydrogen were fed into the gas phase reactor, as well as nitrogen as an inert gas, so that the content of propylene was 86% by mole and the ratio of hydrogen to propylene was 3.8 mol/kmol. The production rate in the reactor was 23 kg/h and the polymer withdrawn from the reactor had a melt flow rate MFR$_2$ of 16 g/10 min. The split between the loop and the gas phase reactor was thus 55/45.

The data for the production rate in the loop, the solids content of the overall slurry withdrawn from first and second outlet as well as the split between the loop phase and gas phase are summarized in Table 1.

b) Inventive Example 2 (IE2)

The polymerization was carried out as described for inventive example 1, with the exception that the hydrogen feeds were changed so that the MFR$_2$ of the obtained propylene homopolymer was 11 g/10 min after the loop reactor and 14 g/10 min after the gas phase reactor, respectively.

The data for the production rate in the loop, the solids content of the overall slurry withdrawn from first and second outlet as well as the split between the loop phase and gas phase are summarized in Table 1.

c) Inventive Example 3 (IE3)

The polymerization was carried out as described for inventive example 1, with the exception that the hydrogen feeds were changed so that the MFR$_2$ of the obtained propylene polymer was 10 g/10 min after the loop reactor and 12 g/10 min after the gas phase reactor, respectively. Furthermore, ethylene was fed into the reactors so that the ethylene content of the propylene copolymer was 1.8 wt.-% after the loop reactor and 2.5 wt.-% after the gas phase reactor, based on the total weight of the propylene copolymer.

The data for the production rate in the loop, the solids content of the overall slurry withdrawn from first and second outlet as well as the split between the loop phase and gas phase are summarized in Table 1.

d) Comparative Example 1 (CE1)

The polymerization was carried out as described for inventive example 1, with the exception that the second outlet was not used.

The data for the production rate in the loop, the solids content of the overall slurry withdrawn from the first outlet as well as the split between the loop phase and gas phase are summarized in Table 1.

e) Comparative Example 2 (CE2)

The polymerization was carried out as described for inventive example 3, with the exception that the second outlet was not used. Furthermore, ethylene was fed into the reactors so that the ethylene content of the propylene copolymer was 2 wt.-% after the loop reactor and 3.4 wt.-% after the gas phase reactor, based on the total weight of the propylene copolymer. The data for the production rate in the loop, the solids content of the overall slurry withdrawn from the first outlet as well as the split between the loop phase and gas phase are summarized in Table 1.

TABLE 1

|  |  | IE 1 | IE 2 | IE 3 | CE 1 | CE 2 |
|---|---|---|---|---|---|---|
| Production rate of the loop reactor | [kg/h] | 29 | 30 | 32 | 30 | 30 |
| Solids content of the withdrawn slurry | [wt.-%] | 23 | 23 | 22 | 18 | 16 |
| Split between loop reactor/ gas phase reactor | [—] | 55/45 | 55/45 | 55/45 | 46/54 | 46/54 |

It can be gathered from Table 1 that a polymerization of olefin monomers in a cascade of polymerization reactions results in a production split between loop reactor and gas phase reactor of about 46/54 if the loop reactor is run with a single outlet. In contrast thereto, if the loop reactor is run with a combination of two outlets located at different positions of the loop reactor, i.e. first and second outlet, the polymerization of olefin monomers results in a split between loop reactor and gas phase reactor of about 55/45. Accordingly, a loop reactor equipped with first and second outlet in accordance with the present application allows shifting of the production split between loop reactor and gas phase reactor in the direction of the loop reactor.

The invention claimed is:

1. A method for preparing olefin polymer in at least one loop reactor, said loop reactor comprises:
   (a) at least one lower horizontal segment and/or at least one lower bend,
   (b) at least one upper horizontal segment and/or at least one upper bend, and
   (c) at least two vertical segments,
   connected in operable communication,
   said loop reactor further comprises
   (d) a first outlet for withdrawing a first polymer slurry from the loop reactor, said first polymer slurry comprises olefin polymer and fluid phase; said first outlet is located such that the first polymer slurry withdrawn has a concentration of polymer which is the same as or higher than the average concentration of polymer in the loop reactor, and
   (e) a second outlet for withdrawing a second polymer slurry from the loop reactor, said second polymer slurry comprises olefin polymer and fluid phase; said second outlet is located such that the second polymer slurry withdrawn has a concentration of polymer which is lower than the average concentration of polymer in the loop reactor,
   the method comprises the steps of
   (i) supplying olefin monomers, a catalytic system, and optionally olefin comonomers to the loop reactor to form a polymer slurry in the loop reactor, and
   (ii) controlling
      (ii1) the total amount of polymer withdrawn from the loop reactor, and/or
      (ii2) the total amount of polymer slurry withdrawn from the loop reactor, and/or
      (ii3) the concentration of polymer within the total polymer slurry withdrawn from the loop reactor
      by adjusting the ratio of the first polymer slurry withdrawn through the first outlet and the second polymer slurry withdrawn through the second outlet, and
   (iii) optionally transferring the withdrawn total polymer slurry into a second reactor.

2. Method according to claim 1, wherein:
   (a) the first polymer slurry and the second polymer slurry are withdrawn through the first and second outlet, respectively, and are directly transferred, into the second reactor, and/or (b) the first polymer slurry and the second polymer slurry are combined and subsequently transferred into the second reactor.

3. Method according to claim 1, wherein in the second reactor, a polymer is produced different than the polymer produced in the loop reactor, and the weight ratio of polymer produced in the loop reactor and the polymer produced in the second reactor is 75:25 to 40:60.

4. Method according to claim 1, wherein the average concentration of polymer in the polymer slurry within the loop reactor is between 15 wt. % and 55 wt. %, based on the total weight of the polymer slurry in the loop reactor.

5. Method according to claim 1, wherein in case of controlling between 65 wt. % and 95 wt. %, based on the weight of the withdrawn total polymer slurry, of first polymer slurry is withdrawn through the first outlet and between 5 wt. % and 35 wt. %, based on the total weight of the total withdrawn polymer slurry, of second polymer slurry is withdrawn through the second outlet.

6. Method according to claim 1, wherein the second polymer slurry withdrawn through the second outlet has an amount of polymer of:
(a) more than 0.1 wt. %, based on the total weight of the withdrawn second polymer slurry through the second outlet, and/or
(b) at most 10 wt. %, based on the total weight of the withdrawn second polymer slurry through the second outlet.

7. Method according to claim 1, wherein the ratio of first polymer slurry withdrawn through the first outlet and second polymer slurry withdrawn through the second outlet [PS-O1/PS-O2] is at least 1.8, wherein:
"PS-O1" is the amount of first polymer slurry withdrawn through the first outlet, and
"PS-O2" is the amount in weight percentage of second polymer slurry, withdrawn through the second outlet.

8. Method according to claim 1, wherein:
(a) the first polymer slurry is withdrawn intermittently or continuously through the first outlet, and/or
(b) the second polymer slurry is withdrawn intermittently or continuously through second outlet.

9. Method according to claim 1, wherein the first outlet is located at the outer periphery of the loop reactor and/or the second outlet is located at the inner periphery of the loop reactor.

10. Method according to claim 1, wherein the loop reactor comprises:
(a) one lower horizontal segment,
(b) two lower bends,
(c) one upper horizontal segment,
(d) two upper bends, and
(e) two vertical segments,
connected in operable communication, wherein the two lower bends joining the lower horizontal segment with the two vertical segments and the two upper bends joining the upper horizontal segment with the two vertical segments,
the first outlet is located at the outer periphery of the lower horizontal segment or of one of the two lower bends of the loop reactor, and
the second outlet is located at
(i) the inner periphery of the lower horizontal segment of the loop reactor or of the inner periphery of one of the two lower bends of the loop reactor, and/or
(ii) the inner periphery of the upper horizontal segment of the loop reactor or the inner periphery of one of the two upper bends of the loop reactor.

11. Method according to claim 1, wherein the loop reactor comprises
(a) one lower bend,
(b) one upper bend, and
(c) two vertical segments
connected in operable communication, wherein the lower bend and upper bend joining the two vertical segments,
the first outlet is located at the outer periphery of the lower bend of the loop reactor, and
the second outlet is located at
(i) the inner periphery of the lower bend of the loop reactor, and/or
(ii) the inner periphery of the upper bend of the loop reactor.

12. Method according to claim 1, wherein:
(a) the first and second outlet are connected with the second reactor via separate conduits, and/or
(b) the conduit of the first outlet and the conduit of the second outlet are connected to each other at a connection point upstream to the second reactor and a further conduit leads form said connecting point into the second reactor.

13. Polymerization reactor system comprising a plurality of polymerization reactor vessels for preparing olefin polymers, said polymerization reactor system comprises in a cascade at least one loop reactor and at least one further reactor,
wherein said loop reactor comprises:
(a) at least one lower horizontal segment and/or at least one lower bend,
(b) at least one upper horizontal segment and/or at least one upper bend, and
(c) at least two vertical segments
connected in operable communication,
said loop reactor further comprises a first and second outlet suitable for withdrawing polymer slurry,
said first and second outlet are connected with the second reactor via a conduit,
wherein further,
the first outlet is located at the outer periphery of the lower horizontal segment or of the lower bend of the loop reactor and
the second outlet is located at
(i) the inner periphery of the lower horizontal segment of the loop reactor or of the inner periphery of the lower bend of the loop reactor, and/or
(ii) the inner periphery of the upper horizontal segment of the loop reactor or the inner periphery of the upper bend of the loop reactor.

14. Polymerization reactor system according to claim 13, wherein the conduit of the first outlet and the conduit of the second outlet are connected to each other at a connection point upstream to the second reactor and a further conduit leads from said connecting point into the second reactor.

15. Method for controlling the average residence time of an olefin polymer formed in a loop reactor and/or in a loop reactor of polymerization reactor system, said loop reactor comprises:
(a) at least one lower horizontal segment and/or at least one lower bend,
(b) at least one upper horizontal segment and/or at least one upper bend, and
(c) at least two vertical segments,
connected in operable communication,
said loop reactor further comprises
(d) a first outlet for withdrawing a first polymer slurry from the loop reactor, said first polymer slurry comprises olefin polymer and fluid phase; said first outlet is located such that the first polymer slurry withdrawn has a concentration of polymer which is the same as or higher than the average concentration of polymer in the loop reactor, and (e) a second outlet for withdrawing a second polymer slurry from the loop reactor, said second polymer slurry comprises olefin polymer and fluid phase; said second outlet is located such that the second polymer slurry withdrawn has a concentration of polymer which is lower than the average concentration of polymer in the loop reactor, the method comprises the steps of (i) supplying olefin monomers, a catalytic system, and optionally olefin comonomers to the loop reactor to form a polymer slurry in the loop reactor, and (ii) controlling (ii1) the total amount of polymer withdrawn from the loop reactor, and/or (ii2) the total amount of polymer slurry withdrawn from the loop reactor, and/or (ii3) the concentration of polymer within the total polymer slurry withdrawn from the loop reactor by adjusting the ratio of the first polymer slurry withdrawn through the first outlet and the second polymer slurry withdrawn through the second outlet.

* * * * *